Feb. 16, 1971  J. C. F. C. RICHTER  3,563,891
LIQUID SEPARATION DEVICE IN A CELLULOSIC MATERIAL
PROCESS VESSEL
Filed Jan. 17, 1969  2 Sheets-Sheet 1

INVENTOR

Johan C.F.C. Richter

BY Cushman, Darby & Cushman

ATTORNEYS

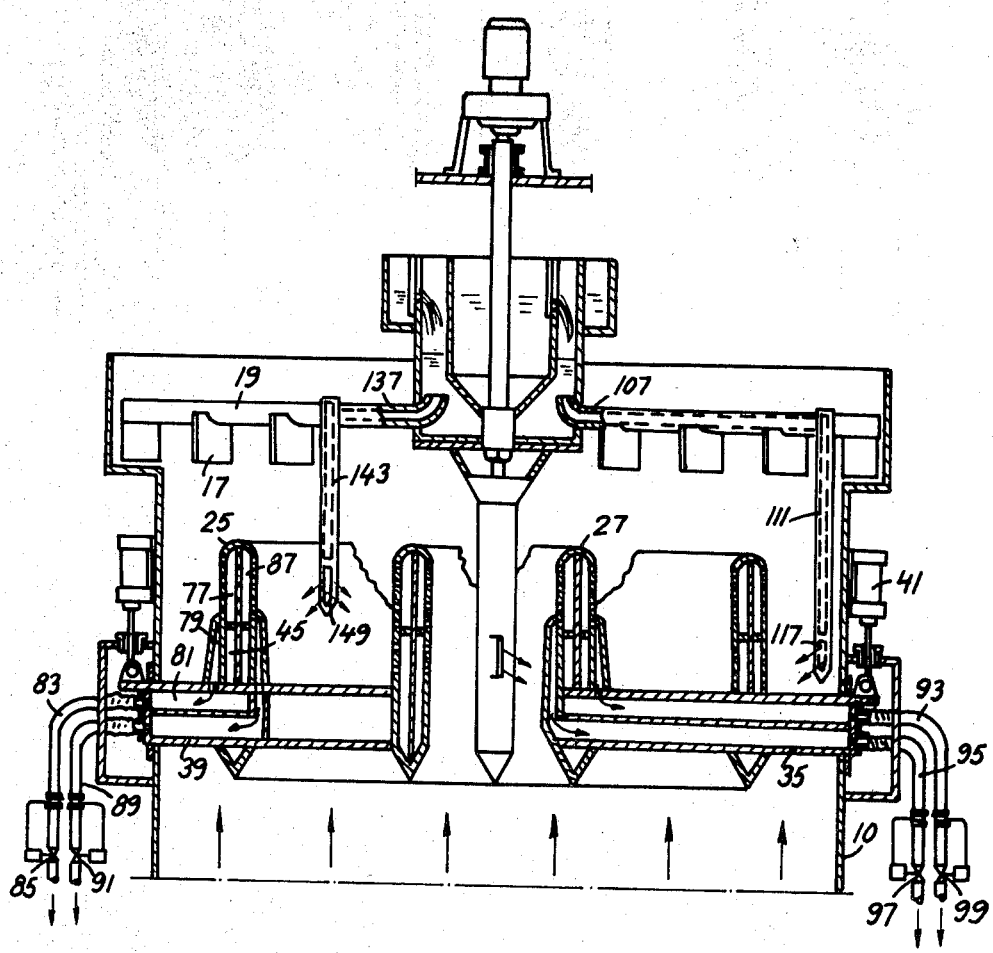

United States Patent Office 3,563,891
Patented Feb. 16, 1971

3,563,891
LIQUID SEPARATION DEVICE IN A CELLULOSIC MATERIAL PROCESS VESSEL
Johan C. F. C. Richter, St. Jean Cap Ferrat, France, assignor to Aktiebolaget Kamyr, Karlstad, Sweden, a company of Sweden
Filed Jan. 17, 1969, Ser. No. 792,108
Claims priority, application Sweden, Jan. 19, 1968, 705/68
Int. Cl. B01d 29/42
U.S. Cl. 210—315                                     8 Claims

ABSTRACT OF THE DISCLOSURE

Apparatus for removing liquid from cellulosic pulp suspensions comprising a cylindrical container through which the suspension is axially moved and liquid withdrawal means comprising a set of hollow screen bodies arranged concentrically in the container and having cylindrical screen faces through which the liquid is withdrawn for discharge. Discharge of liquid from the various screen faces is separately controlled, a number of discharge conduits and exterior control valves being provided.

---

Figure 1:
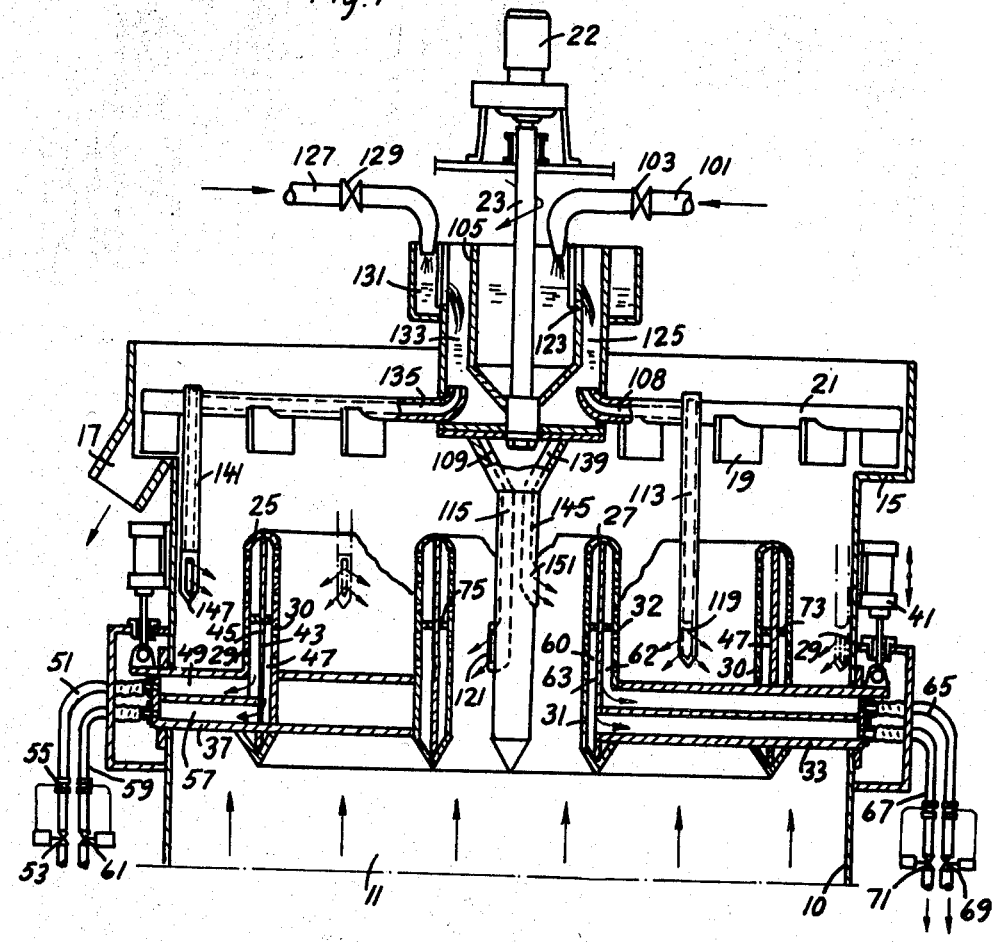

The invention relates to a device in a standing cylindrical container adapted for axial feed therethrough of a suspension of cellulosic fibre material, for withdrawing part of the liquid of the suspension by means of a set of hollow screening bodies inserted in the container and having cylindrical screen faces concentric to the shell of the container and cavities communicating with liquid outlet conduits. In devices of said kind it has been proposed, for instance in the U.S. patent specification No. 3,348,390, to replace the liquid screened off the fibre material suspension by a liquid spread over the cross-section of the container in such a distribution that there is obtained an approximately equally great screening effect of the various screen faces. However, difficulties have been experienced in guiding the flow, particularly when the liquid supplied through one and the same nozzle should divide and flow towards two separate screen faces located on opposite sides of and at approximately the same distance frim said nozzle. According to the present invention said difficulties are eliminated or reduced by connecting screen faces of different radii to separate discharge conduits. Then according to a secondary feature of the invention it is possible to provide said discharge conduits with separate flow control means. Said means preferably consist of individually adjustable control valves.

The invention will be more closely described herein below with reference to the accompanying drawings, in which FIGS. 1 and 2 show vertical and axial cross-sectional views taken at right angles to each other, of a container provided with the screening device of the invention.

In FIGS. 1 and 2, the numeral 10 designates the steel plate or concrete shell of a standing cylindrical container preferably adapted for the performance of a chemical process or some other treatment of pulp consisting of a liquid suspension of cellulosic fibre material. For instance, the container may consist of a digester for wood chips, straw or other finely comminuted vegetabilic material or of a tower for bleaching cellulosic pulp which has already been digested and defibrated and is of a more or less dense consistency. Alternatively, the container may be adapted merely for washing of pulp.

By means of a pump, pulp is supplied continuously to the lower end (not shown) of the container and is spread there (e.g., by means of a spreading device of the design shown in the U.S. patent specification No. 2,764,011) over the cross-sectional area of the container, so that the pulp as indicated by the arrows 11 in FIG. 1, moves axially upwards through the container with substantially the same speed everywhere. At its upper end the cylindrical shell 10 of the container has a widened part 15 with an outlet 17, into which the uppermost layer of the pulp column slowly rising in the tower, is diverted by means of a discharging device consisting of scraper blades 19 attached to arms 21 which extend radially from a shaft 23 concentric to the container shell and driven by a motor 22.

A screening device arranged in the container is composed of screen bodies 25, 27, concentric to each other and to the container shell 13. The screen body 25 has an inner, concave screen face and an outer, convex screen face in the shape of a perforated or slitted cylindrical plate 29 or 30, respectively, and an inner cavity. The same applies to the screen body 27. The screen bodies are located at the same level and are of the same axial extension, and they are mutually connected and supported by horizontally and radically directed carrying arms 33, 35, 37, 39, the cross sections of which preferably are streamlined in respect of the axial flow of the pulp. Said arms extend out through the shell 10, and a hydraulic operating device 41 is attached to the outer end of each of them. The described set of screen bodies is somewhat displaceable in the axial direction in the container, whereby it will accompany the slowly rising pulp a short distance upwards, and by the operating devices 41 the screen bodies are periodically and comparatively rapidly returned in the downward direction, a relative motion taking place between their screening faces and the pulp.

According to the invention the cavity within the screen body 25 is divided up by a cylindrical partition wall 43 so as to form two separate concentric cavities 45, 47. One cavity 45 is situated behind the convex screen plate 29 of greater diameter and collects filtrate passing therethrough, whereas the other cavity 47 is situated behind the concave screen plate 30 of smaller diameter and collects filtrate passing therethrough. By means of a passage 49 in the supporting arm 37 and a flexible hose connection the cavity 45 communicates with a stationary discharge conduit 51 located outside of the container 10. Inserted in said conduit is a control means in the shape of a valve 53 which can be adjusted so as to let through a certain desired quantity of liquid per time unit, the adjustment taking place either manually or automatically under the control of a flow meter 55 inserted in the conduit 51. Through a passage 57 in the supporting arm 37 the cavity 47 communicates in a similar manner with a second discharge conduit 59 with control valve 61.

The screen body 27 is similarly provided with a cylindrical partition wall 63 dividing the interior space of said body into two separate cavities 60, 62 which by means of passages in the supporting arm 33 communicate each with a separate exterior discharge conduit 65 or 67 with control valve 69 or 71, respectively.

When the pulp rises past the screen faces 29, 30, 31, 32, part of its liquid content penetrates into the cavities of the screen bodies and runs out through the discharge conduits 51, 59, 65, 67 which may be held under vacuum in order to increase the flow. By adjustment of the valves 53, 61, 69, 71 it is possible to control the total liquid quantity carried-off through said conduits as well as the distribution thereof upon the various conduits. Therefore, it is possible to control the screening effect in such a manner that the pulp will be treated quite uniformly over the cross section of the container and so that the pulp, in case it is desired to concentrate the same by liquid withdrawal, obtains approximately the same consistency at the central parts as at the peripheral parts of the pulp column. Of course, the uniformity is improved as the number of screen bodies increases. For the sake of clarity the drawing shows merely two screen bodies but usually it is preferable to have a greater number, for instance 4, 5 or more concentric screen bodies. Then the number of cavities gets so great that it may be advantageous to connect them in groups to common discharge conduits. As the liquid of the pulp rising in the space between two screen bodies has a tendency to flow less easily towards the inner convex screen face then to the outer concave screen face, it may be advantageous to connect the convex screen faces of the various screen bodies in parallel to a first common discharge conduit and to connect the concave screen faces in common to a second discharge conduit which can be controlled independently. Thereby said tendency can be counteracted and the screening effect made as good in both directions.

The invention may also be applied when the screen bodies are divided into height zones, as is shown in the drawings. Thus, the screen bodies 25, 27 are internally divided by horizontal partition walls 73, 75 so as to form an upper group of cavities completely separated from the above-mentioned cavities and their outlets. Said upper cavities which may serve for withdrawing from the pulp a liquid fraction usually having a smaller chemical content, are connected to a separate system of discharge conduits similar to the one above described for the lower cavities of the screen bodies. Consequently, the upper cavities are divided in the radial direction, the cylindrical walls 43, 63 extending beyond the horizontal partition walls 73, 75 to the uppermost edges of the screen bodies. By means of a bypass 79 the upper outer cavity 77 of the wider screen body 25 communicates with a passage 81 in the supporting arm 39, from where the withdrawn liquid runs to an exterior discharge conduit 83 with control valve 85. In a similar manner the inner upper cavity 87 communicates with a discharge conduit 89 with control valve 91. By means of bypasses and passages in the supporting arm 35 the two upper cavities of the narrower screen body 27 communicate each with a separate one of two further discharge conduits 93, 95 with control valves 97, 99. Also the upper cavities may be connected in groups to common discharge conduits with separate control.

In order to replace, wholly or partly, the liquid screened off the pulp by the screen bodies there is provided a device for supply of replacement liquid and distribution thereof within the pulp. Said device is divided into two separate systems and two dissimilar liquids can be distributed at different levels in the container. One system comprises a stationary supply conduit 101 with control valve 103, a tank 105 attached to the shaft 23, distribution tubes 107, 108, 109 and vertical spray tubes 111, 113, 115 having nozzles 117, 119, 121, respectively. By means of adjustable gates 123 the liquid quantity supplied to the tank 105 is distributed in proper proportions upon three compartments 125 located outside of the tank 123 and consequently upon said three nozzles. The other liquid supply system comprises a stationary supply conduit 127 with control valve 129, a revolving tank 131, three distribution compartments 133, distribution tubes 135, 137, 139, and vertical spray tubes 141, 143, 145 provided with nozzles 147, 149, 151. The nozzles are long in the vertical direction so that when the shaft 23 is turned, each nobzzle will spread liquid over a cylindrical face. The nozzles 117, 119, 121 have the same vertical extension and are located at the same level, and the same applies to the nozzles belonging to the group 147, 149, 151. The spray tube 111 belonging to the first liquid distribution system moves in a path having the same radius as the path of the spray tube 141 belonging to the other liquid distribution system, but the nozzle 117 of the former is axially offset relatively to the nozzle 147 of the last-mentioned spray tube. Therefore, liquid of the kind supplied through the conduit 101 is distributed over a cylindrical face having the same radius as, but another location in the height direction than the cylindrical faces over which liquid from the conduit 127 is spread. The same applies to the relative position of the nozzles 119, 149 and to the relative position of the nozzles 121, 151. Thus, the entire liquid distribution device spreads two liquids over different height zones, and in each zone the liquid is distributed upon nozzles moving between or on one side only of the screen bodies 25, 27. Furthermore, the nozzles are located in the level range of the screen bodies, involving that the displacement flow of liquid through the pulp will be transversally directed relatively to the axial flow of the pulp, viz substantially horizontal and radial. The levels of the nozzles may correspond approximately to the levels of the divisions of the screen bodies above and below the partition walls 73, 75, but often a certain mutual offset in the axial direction is preferable.

The described liquid distribution device provides a fairly even distribution of liquid in the radial direction but it cannot provide that the liquid quantity ejected into the pulp, e.g., from the nozzle 119, is divided properly in opposite radial directions; experience has shown that if the cavities 47, 62 were connected in parallel, a smaller liquid quantity would pass through the comparatively smaller screen face 32 into the cavity 62 than through the comparatively greater screen face 30 into the cavity 47. Now according to the invention, it is possible to adjust by means of the valves 61, 69 said liquid quantities in the proper proportion and to obtain flow of liquid from the nozzle 119 distributed properly in the two opposite radial directions, so that the previous liquid contents of the pulp are displaced to the same extent out of the pulp moving between the cylindrical path of said nozzle and the concave screen face 30, as out of the pulp moving between said path and the convex screen face 32.

What is claimed is:

1. In a standing cylindrical container adapted for axial flow of a suspension of cellulosic fiber material therethrough, a device for withdrawing part of the liquid of the suspension by means of a set of hollow screening bodies inserted in the container, each of said screening bodies being composed of a pair of opposed cylindrical screen faces which are concentric to the axis of the container and of different radii so as to define between them a cavity for collecting liquid withdrawn from said material through said screen faces, said cavity being divided into separate sections, and separate liquid discharge conduits communicating with said different sections for discharge of liquid therefrom, said screen faces communicating with said different sections of said cavity so that liquid withdrawn into each section is discharged separately from liquid in another section through its own discharge conduit and separately adjustable control valves inserted in said discharge conduits.

2. Device according to claim 1, characterized in that screen faces of different radii are associated with outlet conduits provided with separate flow control means, by means of which the withdrawal of liquid through one screen face is controllable independently of the withdrawal of liquid through another screen face.

3. Device according to claim 1 wherein at least one of the hollow screening bodies is provided with a central cylindrical partition wall to form said separate sections, each one of the sections on opposite sides of said partition wall being connected to a separate discharge conduit.

4. Device according to claim 1 characterized in that each screening body is composed of a convex screen face and a concave screen face, the concave screen face being operatively connected to a different discharge conduit from the convex screen face.

5. Device according to claim 4, characterized in that at least the majority of the concave screen faces in said screening bodies are connected in parallel to a common discharge conduit and in that at least the majority of the convex screen faces are connected to a different common discharge conduit.

6. Device according to claim 1, wherein the screening bodies are divided into sections comprising height zones associated with separate outlets and means are provided for separately controlling the flow through said outlets.

7. Device according to claim 6 wherein each height zone of a screening body is provided with a central cylindrical partition wall and with means for separately controlling the flow from the resulting sections on opposite sides of said central wall.

8. In a standing cylindrical container adapted for axial flow of a suspension of cellulosic fiber material therethrough, a device for withdrawing part of the liquid of the suspension by means of a set of hollow screening bodies inserted in the container and having cylindrical and opposed convex and concave screen faces concentric to the shell of a container and cavities communicating with liquid discharge conduits, characterized in that screen faces of different radii are associated with separate discharge conduits, all or the majority of the concave screen faces are connected in parallel to a common discharge conduit and in that all or the majority of the convex screen faces are connected to another common discharge conduit.

References Cited
UNITED STATES PATENTS
651,621   6/1900   Black et al. _____ 210—342

FOREIGN PATENTS
43,820   11/1960   Poland _____ 210—315

FRANK A. SPEAR, Jr., Primary Examiner

U.S. Cl. X.R.

210—342